(12) United States Patent
Nomura et al.

(10) Patent No.: US 12,732,299 B2
(45) Date of Patent: Sep. 8, 2026

(54) CONTROL APPARATUS, COMMUNICATION SYSTEM, CONTROL METHOD AND PROGRAM

(71) Applicant: NTT, Inc., Tokyo (JP)

(72) Inventors: Hiroko Nomura, Musashino (JP); Hirotaka Ujikawa, Musashino (JP); Kenji Miyamoto, Musashino (JP); Kota Asaka, Musashino (JP); Yoshihito Sakai, Musashino (JP); Tatsuya Shimada, Musashino (JP)

(73) Assignee: NTT, Inc., Tokyo (JP)

( * ) Notice: Subject to any disclaimer, the term of this patent is extended or adjusted under 35 U.S.C. 154(b) by 240 days.

(21) Appl. No.: 18/694,838

(22) PCT Filed: Oct. 4, 2021

(86) PCT No.: PCT/JP2021/036566
§ 371 (c)(1),
(2) Date: Mar. 22, 2024

(87) PCT Pub. No.: WO2023/058078
PCT Pub. Date: Apr. 13, 2023

(65) Prior Publication Data

US 2024/0405909 A1 Dec. 5, 2024

(51) Int. Cl.
*H04J 14/02* (2006.01)

(52) U.S. Cl.
CPC ...... *H04J 14/0227* (2013.01); *H04J 14/0212* (2013.01); *H04J 2203/0058* (2013.01)

(58) Field of Classification Search
CPC ............... H04J 14/0212; H04J 14/0227; H04J 2203/0058; H04L 69/00
See application file for complete search history.

(56) References Cited

U.S. PATENT DOCUMENTS 7,246,156 B2 * 7/2007 Ginter ................. H04L 63/1441 709/227
7,983,558 B1 * 7/2011 Gerstel .................. H04L 45/00 398/33

(Continued)

FOREIGN PATENT DOCUMENTS

JP 2014-099877 A 5/2014
JP 2014-127969 A 7/2014

(Continued)

OTHER PUBLICATIONS

"Cooperative Transport Interface Transport Control Plane Specification", 0-RAN.WG4.CTI-TCP.0-v01.00, 0-RAN Fronthaul Working Group 4, Nov. 2020.

*Primary Examiner* — Mohammed Abdelraheem
(74) *Attorney, Agent, or Firm* — Harness, Dickey & Pierce, PLC

(57) ABSTRACT

A control device includes an acquisition unit that acquires information from a distributed station that notifies the information related to one or more events occurred within a predetermined time period at a predetermined notification frequency, an information analysis unit that executes analysis processing on the information, a frequency derivation unit that derives an occurrence frequency of the information, a load derivation unit that derives a load of analysis processing of the information, and a frequency control unit that controls the predetermined notification frequency with a frequency lower than the occurrence frequency as an upper limit on the basis of at least one of an analysis result of the information, an occurrence frequency of the information, and a load of analysis processing of the information.

4 Claims, 11 Drawing Sheets

(56) References Cited

U.S. PATENT DOCUMENTS

| | | | | |
|---|---|---|---|---|
| 8,542,999 | B2 * | 9/2013 | Barnard | H04J 14/02122 398/43 |
| 2007/0224977 | A1 * | 9/2007 | Yamaguchi | G01S 5/0009 455/414.2 |
| 2010/0046451 | A1 * | 2/2010 | Tada | H04W 72/04 370/329 |
| 2013/0185444 | A1 * | 7/2013 | Meenan | H04L 43/0811 709/227 |
| 2014/0185444 | A1 | 7/2014 | Inoue et al. | |
| 2015/0023663 | A1 * | 1/2015 | Gerstel | H04J 14/0268 398/49 |
| 2023/0155712 | A1 * | 5/2023 | Harada | H04J 14/0213 398/83 |

FOREIGN PATENT DOCUMENTS

| | | | | |
|---|---|---|---|---|
| WO | WO-2004111785 | A2 * | 12/2004 | H04L 63/1408 |
| WO | WO-2005/109933 | A1 | 11/2005 | |
| WO | WO-2014000987 | A1 * | 1/2014 | H04L 67/10 |
| WO | WO-2021/176497 | A1 | 9/2021 | |

* cited by examiner

FIG. 4
TIME
TIME
TIME
t1
t2
t3
t4
t5
t6
OCCURRENCE OF IRREGULAR INFORMATION
NOTIFICATION FROM DISTRIBUTED STATION
CYCLE OF ANALYSIS PROCESSING

FIG. 8
OCCURRENCE OF IRREGULAR INFORMATION
NOTIFICATION FROM DISTRIBUTED STATION
CYCLE OF ANALYSIS PROCESSING
TIME
TIME
TIME
t21
t22
t23
t24
t25
t26
t27

CONTROL APPARATUS, COMMUNICATION SYSTEM, CONTROL METHOD AND PROGRAM

CROSS-REFERENCE TO RELATED APPLICATIONS

This application is a 371 U.S. National Phase of International Application No. PCT/JP2021/036566, filed on Oct. 4, 2021. The entire disclosure of the above application is incorporated herein by reference.

TECHNICAL FIELD

The present invention relates to a control apparatus, a communication system, a control method and a program.

BACKGROUND ART

An "O-RAN (Open Radio Access Network) CTI (Cooperative transport interface)" is known as an interface in a mobile fronthaul of an optical communication system. A "CTI Report message" including communication scheduling information is exchanged between a distributed station (O-DU: O-RAN Distributed Unit) and a transport node (TN: Transport Node) in the mobile fronthaul (see NPD 1).

Between the distributed station and a user terminal (UE: User Equipment), scheduling is performed for transmission of packets transmitted upward from the user terminal. Further, between the transport node and a transport unit (TU) in a transport network of the mobile fronthaul, communication scheduling is also performed.

In order to improve efficiency of these scheduling, the distributed station (O-DU) regularly notifies the transport node of the scheduling information in a minimum unit (TTI: Transmission Time Interval) of scheduling by using CTI. The transport node executes scheduling control in the transport network on the basis of the scheduling information.

In order to exchange "CTI Report message" between the distributed station and the transport node, both the distributed station and the transport node must support the same exchange frequency. In "O-RAN CTI", the minimum value of the exchange frequency is defined as a performance parameter "CTI_MIN". The minimum value of the supported exchange frequency is 250 μs. In addition, a nominal value of the exchange frequency (CTI Nominal message exchange time interval) is defined as a performance parameter "CTI_NOM". The exchange frequency of "CTI message" between the distributed station and the transport node is determined based on the performance parameter "CTI_NOM".

CITATION LIST

Non Patent Document

[NPD 1] "Cooperative Transport Interface Transport Control Plane Specification", O-RAN.WG4.CTI-TCP.0-v01.00, O-RAN Fronthaul Working Group 4, November 2020

SUMMARY OF INVENTION

Technical Problem

In "O-RAN CTI", it is defined to analyze scheduling information regularly notified in a minimum unit (TTI) of scheduling. However, in the "O-RAN CTI", when the minimum unit of scheduling is shorter than 250 μs (for example, when the minimum unit of scheduling is 125 μs or less), an operation such as analyzing the notified scheduling information is not defined. Also, a method of notifying scheduling information related to an event that occurs irregularly is not defined.

Therefore, it is necessary to expand the CTI. When the CTI is expanded, not only the scheduling information but also information specified in a specification number "TS28.552" of 3GPP (Third Generation Partnership Project) and information specified in specification numbers of "TS23.502 4.2.2""" "TS38.401" and of 3GPP may be notified to a wavelength allocation control device as information used for judging a wavelength switching to an optical path (hereinafter referred to as "switching judgement information").

Information specified in a specification number "TS28.552" is information on the number of connections of the user terminal in a cell (session information) (UE active) and average throughput information the user terminals, for example.

Information specified in specification numbers "TS23.502 4.2.2" and "TS38.401" is "Registration information" (UE Registration) of the user terminal, for example.

Further, it is necessary for the distributed station to notify the wavelength allocation control device of the switching judgement information by using the above-mentioned expanded CTI. Here, even when the minimum unit of scheduling is shortened to less than 250 μs, the wavelength allocation control device analyzes the notified switching judgement information using the expanded CTI. For example, the wavelength allocation control device analyzes a fluctuation in a communication band. The wavelength allocation control device allocates the wavelength again to a route (optical path) of an optical signal on the basis of an analysis result (prediction result). Thus, the wavelength allocation control device controls the optical path in the optical communication system.

In the fifth generation mobile communication system (5G), the distributed station may notify the wavelength allocation control device of the switching judgement information at a cycle of 125 μs or less in order to cope with a low delay service. When the wavelength allocation control device analyzes the switching judgement information in accordance with the cycle of 125 μs or less, a load of processing for allocating the wavelength to the optical path by the wavelength allocation control device is increased compared with a case where the wavelength allocation control device analyzes the switching judgement information in accordance with a cycle of 250 μs. However, there is a problem that an increase in the load of processing for allocating the wavelength to the optical path cannot be suppressed.

In view of the above circumstances, an object of the present invention is to provide a control device, a communication system, a control method, and a program capable of suppressing the increase in the load of processing for allocating the wavelength to the optical path.

Solution to Problem

An aspect of the present invention is a control device including an acquisition unit that acquires information from a distributed station that notifies the information related to one or more events occurred within a predetermined time period at a predetermined notification frequency, an information analysis unit that executes analysis processing on the information, a frequency derivation unit that derives an occurrence frequency of the information, a load derivation unit that derives a load of analysis processing of the information, and a frequency control unit that controls the predetermined notification frequency with a frequency lower than the occurrence frequency as an upper limit on the basis of at least one of an analysis result of the information, an occurrence frequency of the information, and a load of analysis processing of the information.

An aspect of the present invention is a communication system including a distributed station and a control device, wherein the distributed station includes a notification processing unit that notifies information related to one or more events occurred within a predetermined time period at a predetermined notification frequency, and the control device includes an acquisition unit that acquires the information, an information analysis unit that executes analysis processing on the information, a frequency derivation unit that derives an occurrence frequency of the information, a load derivation unit that derives a load of analysis processing of the information, and a frequency control unit that controls the predetermined notification frequency with a frequency lower than the occurrence frequency as an upper limit on the basis of at least one of an analysis result of the information, an occurrence frequency of the information, and a load of analysis processing of the information.

One aspect of the present invention is a control method executed by a control device and including an acquisition step of acquiring information from a distributed station that notifies the information related to one or more events occurred within a predetermined time period at a predetermined notification frequency, an information analysis step of executing analysis processing on the information, a frequency derivation step of deriving an occurrence frequency of the information, a load derivation step of deriving a load of analysis processing of the information, and a frequency control step of controlling the predetermined notification frequency with a frequency lower than the occurrence frequency as an upper limit on the basis of at least one of an analysis result of the information, an occurrence frequency of the information, and a load of analysis processing of the information.

An aspect of the present invention is a program for causing a computer to function as the above-mentioned control device.

Advantageous Effects of Invention

According to the present invention, it is possible to suppress an increase in a load of processing for allocating a wavelength to an optical path.

DESCRIPTION OF EMBODIMENTS

An embodiment of the present invention will be described in detail with reference to the diagrams.

First Embodiment

Figure 1:
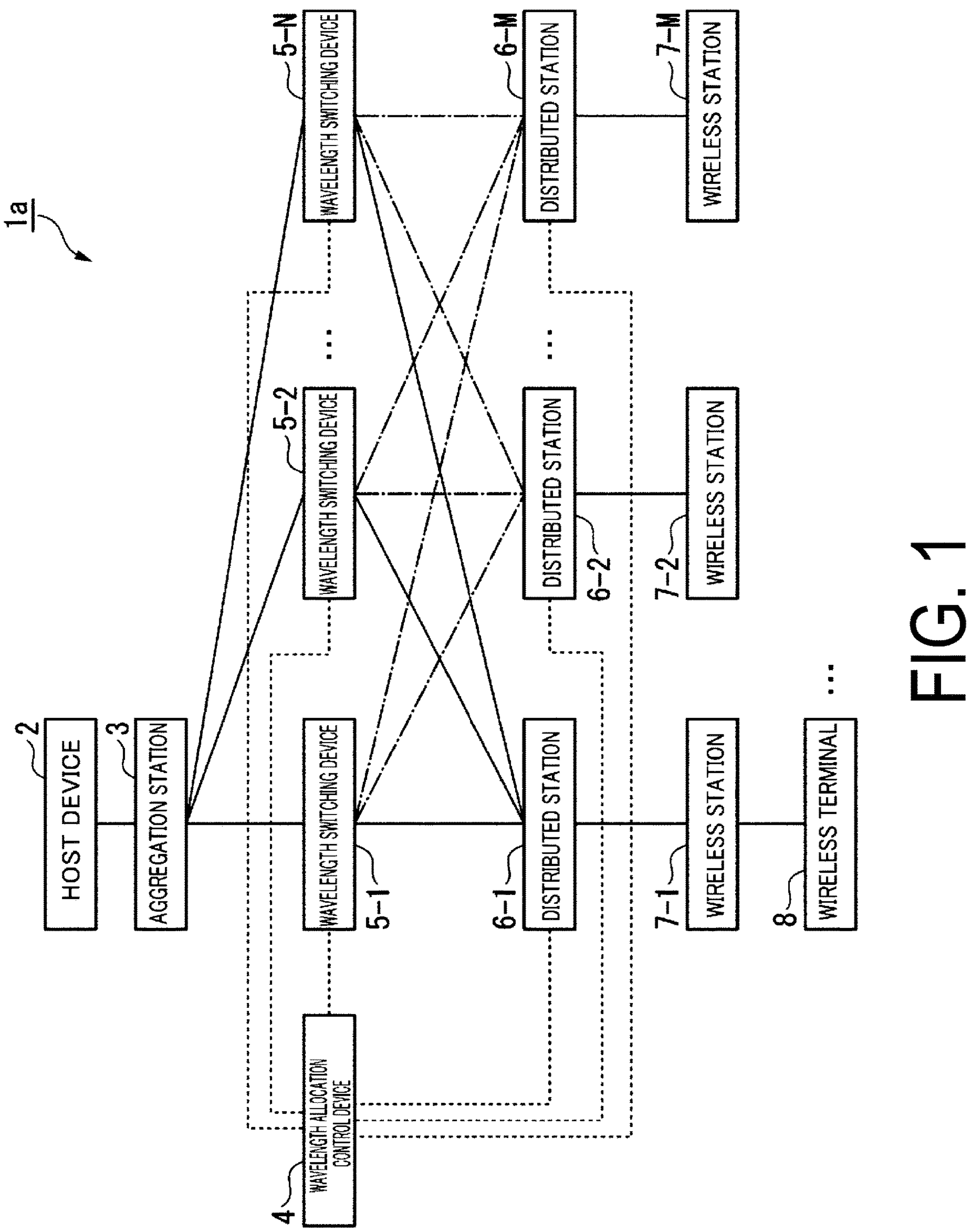
FIG. 1 is a diagram showing a configuration example of a communication system according to a first embodiment.

FIG. 1 is a diagram showing a configuration example of a communication system 1*a* according to a first embodiment. The communication system 1*a* is a system for performing communication using optical signals. The optical signals are transmitted through optical paths. The communication system 1*a* includes a host device 2, an aggregation station 3, a wavelength allocation control device 4, N (N is an integer of 1 or more) wavelength switching devices 5, M (M is an integer of 1 or more) distributed stations 6, and M wireless stations 7. One or more wireless terminals 8 can be communicatively connected to the wireless station 7 associated with the distributed station 6.

The host device 2 acquires upstream data from the wireless terminal 8 via the wireless station 7, the distributed stations 6, the wavelength switching device 5, and the aggregation station 3. The host device 2 transmits downstream data to the wireless terminal 8 via the aggregation station 3, the wavelength switching device 5, the distributed station 6, and the wireless station 7.

The aggregation station 3 acquires the optical signals from one or more distributed stations 6. The aggregation station 3 transmits the upstream data corresponding to the acquired optical signals to the host device 2. The aggregation station 3 acquires the downstream data from the host device 2. The aggregation station 3 transmits the optical signals corresponding to the downstream data to each distributed station 6.

The wavelength allocation control device 4 (control device) (wavelength instruction device) acquires switching judgement information (cooperation information) notified from the distributed station 6 at a predetermined notification frequency. The cooperation information is used for cooperation between the wavelength allocation control device 4 and the distributed station 6. The wavelength allocation control device 4 allocates a wavelength to an optical path between the aggregation station 3 and the distributed station 6 on the basis of an analysis result of the switching judgement information and a network topology of the plurality of wavelength switching devices 5. The wavelength allocation control device 4 transmits a control signal (hereinafter referred to as "allocation signal") related to the wavelength allocation to the optical path to the respective wavelength switching devices 5. The allocation signal may include physical port control information (e.g., "OpenConfig"). The wavelength allocation control device 4 allocates the wavelength to the optical path between the aggregation station 3 and the distributed station 6 by using the allocation signal.

By allocating the wavelength to the optical path, it is possible to control the route (optical path) of the optical signal between the aggregation station 3 and the distributed station 6. For example, when the wireless terminal 8 communicates with only the distributed station 6-1, the wavelength allocation control device 4 may generate the allocation signal so as to collect a plurality of optical paths in the distributed station 6-1.

The wavelength allocation control device 4 transmits the control signal (hereinafter referred to as a "frequency signal") related to the notification frequency of the switching judgement information to the distributed station 6. Thus, it is possible to change the notification frequency of the switching judgement information from the distributed station 6 to the wavelength allocation control device 4.

The wavelength switching device 5 (transfer device) is, for example, an optical gateway. The wavelength switching device 5 acquires the allocation signal from the wavelength allocation control device 4. The wavelength switching device 5 switches the wavelength of the optical signal between the aggregation station 3 and the distributed station 6 on the basis of the allocation signal. Thus, the wavelength switching device 5 switches the route (optical path) of the optical signal between the aggregation station 3 and the distributed station 6.

The distributed station 6 executes communication with one or more wireless terminals 8 (user terminals) via the wireless station 7. The distributed station 6 acquires the signals corresponding to the upstream data of the wireless terminal 8 from the wireless station 7. The distributed station 6 transmits the optical signals corresponding to the upstream data to the aggregation station 3 by using the optical path.

The distributed station 6 transmits the switching judgement information to the wavelength allocation control device 4 at a notification frequency corresponding to the frequency signal. For example, the distributed station 6 transmits switching judgement information (hereinafter referred to as "regular information") related to an event that occurs regularly to the wavelength allocation control device 4 at the notification frequency corresponding to the frequency signal. The regular information is, for example, scheduling information. The notification frequency is, for example, a cycle of 125 μs.

For example, the distributed station 6 transmits the switching judgement information (hereinafter referred to as "irregular information") related to an event that occurs irregularly to the wavelength allocation control device 4 at the notification frequency corresponding to the frequency signal. The irregular information is, for example, information "Registration information" related to the number of connections (the number of sessions) of the wireless terminal 8.

The wireless station 7 (RU: Radio Unit) executes wireless communication with the wireless terminal 8. The wireless terminal 8 (user terminal) is, for example, a mobile terminal or an IoT (Internet of Things) terminal. The wireless terminal 8 transmits the signals of the upstream data to the distributed station 6 via the wireless station 7. Thus, the wireless terminal 8 can transmit the upstream data to the host device 2. The wireless terminal 8 acquires the signals of the downstream data from the distributed station 6 via the wireless station 7. Thus, the wireless terminal 8 can acquire the downstream data from the host device 2.

Figure 2:
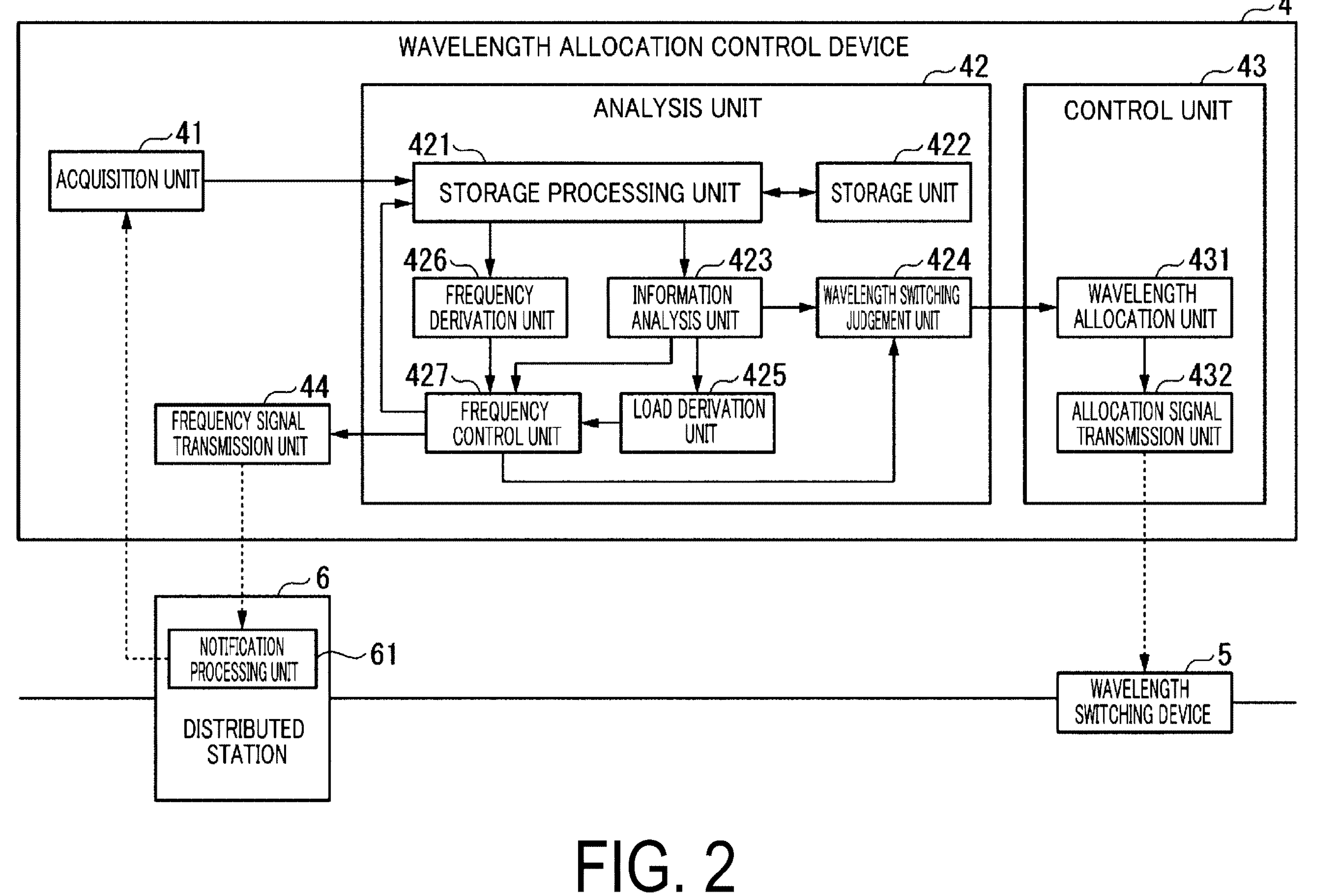
FIG. 2 is a diagram showing a configuration example of a wavelength allocation control device according to the first embodiment.

FIG. 2 is a diagram showing a configuration example of the wavelength allocation control device 4 according to the first embodiment. The wavelength allocation control device 4 includes an acquisition unit 41, an analysis unit 42, a control unit 43, and a frequency signal transmission unit 44. The analysis unit 42 includes a storage processing unit 421, a storage unit 422, an information analysis unit 423, a wavelength switching judgement unit 424, a load derivation unit 425, and a frequency control unit 427. The control unit 43 includes a wavelength allocation unit 431 and an allocation signal transmission unit 432. The distributed station 6 includes a notification processing unit 61.

The switching judgement information may include, for example, information defined in at least one of "O-RAN CTI", "ITU-T G.989.3 Amd.3 G suppl.66", "3GPP TS28.552", "3GPP TS38.300", "3GPP TS23.502 4.2.2", "3GPP TS38.401", and "3GPP TS23.401 5.3.2".

For example, the switching judgement information (regular information) may include the scheduling information (O-RAN CTI) (ITU-T G.989.3 Amd.3 G suppl.66) of the wireless terminal 8 as information (band information) related to the traffic amount. The scheduling information may be, for example, downlink control information (DCI). For example, the switching judgement information (regular information) may include average throughput information of the wireless terminals 8 as information on the traffic amount.

For example, the switching judgement information (irregular information) may include information "the number of active UE" (3GPP TS28.552) related to the number of connections of the wireless terminal 8 in the cell as information related to the communication connection of the wireless terminal 8. For example, the switching judgement information (irregular information) may include "Registration information" (UE Registration) (3GPP TS23.502 4.2.2, TS38.401) as information related to the number of connections of the wireless terminal 8.

The notification processing unit 61 notifies the acquisition unit 41 of the switching judgement information (cooperation information) at the notification frequency corresponding to the frequency signal acquired from the frequency signal transmission unit 44. The notification processing unit 61 transmits the regular information to the acquisition unit 41 at the notification frequency corresponding to the frequency signal. The notification frequency of the regular information is lower than the occurrence frequency of the regular information.

The notification processing unit 61 transmits the irregular information to the wavelength allocation control device 4 at the notification frequency corresponding to the frequency signal. The notification frequency of the irregular information is lower than the occurrence frequency of the irregular information.

The acquisition unit 41 acquires the switching judgement information (cooperation information) from the notification processing unit 61. The acquisition unit 41 outputs the switching judgement information to the storage processing unit 421 each time the switching judgement information is acquired.

The storage processing unit 421 records the notified switching judgement information in the storage unit 422. The storage processing unit 421 may record the notified switching judgement information in the storage unit 422 in association with the notification time point. For example, the storage processing unit 421 associates the notified switching judgement information with the notification time point and records it in the storage unit 422 in the form of table information. The storage processing unit 421 may output the notified switching judgement information to the frequency control unit 427.

The storage processing unit 421 outputs the notified switching judgement information to the information analysis unit 423. The storage processing unit 421 may output the switching judgement information stored in the storage unit 422 to the information analysis unit 423. When the discard instruction signal is inputted from the frequency control unit 427, the storage processing unit 421 discards the past switching judgement information from the storage unit 422.

The storage unit 422 outputs the switching judgement information to the storage processing unit 421 in response to an instruction by the storage processing unit 421. The storage unit 422 stores or discards (deletes) the switching judgement information in response to the instruction by the storage processing unit 421.

The information analysis unit 423 executes predetermined analysis processing to the switching judgement information. For example, the information analysis unit 423 derives (predicts) the traffic amount on the basis of the regular information (scheduling information). For example, the information analysis unit 423 derives a change amount of the number of connections per unit time period with respect to the number of connections (the number of sessions) of the wireless terminal 8 on the basis of the irregular information.

When the change amount of the number of connections per unit time period is equal to or larger than a predetermined threshold value, the information analysis unit 423 multiplies the number of sessions by the traffic amount to derive a band (prediction result) required in the future. The information analysis unit 423 outputs the analysis result (prediction result) to the wavelength switching judgement unit 424. For example, the analysis result includes information on the band required in the future. The information analysis unit 423 may output the analysis result (prediction result) to the frequency control unit 427.

The wavelength switching judgement unit 424 (wavelength switching determination unit) (wavelength switching judge) judges whether or not to allocate the wavelength to the optical path again on the basis of the analysis result. That is, the wavelength switching judgement unit 424 judges whether or not the wavelength switching of the optical signal transmitted through the optical path is necessary on the basis of the analysis result. For example, the wavelength switching judgement unit 424 compares the band required in the future with the currently allocated band. The wavelength switching judgement unit 424 judges whether or not to allocate the wavelength to the optical path again on the basis of the comparison result. For example, if the currently allocated band is insufficient for the band required in the future, the wavelength switching judgement unit 424 determines to allocate the wavelength again to the optical path. The wavelength switching judgement unit 424 outputs a signal instructing the wavelength allocation (hereinafter referred to as "allocation instruction signal") to the wavelength allocation unit 431.

The wavelength switching judgement unit 424 may acquire a signal requesting the wavelength allocation (hereinafter referred to as "allocation request signal") from the frequency control unit 427. The wavelength switching judgement unit 424 outputs the allocation instruction signal to the wavelength allocation unit 431 even when the allocation request signal is acquired.

The load derivation unit 425 derives a load (a load of analysis processing of switching judgement information) of processing in the information analysis unit 423. The load derivation unit 425 outputs information representing a load of processing in the information analysis unit 423 (hereinafter referred to as "load information") to the frequency control unit 427.

The frequency derivation unit 426 derives the occurrence frequency of the switching judgement information notified to the storage processing unit 421. The frequency derivation unit 426 output information representing the occurrence frequency of the notified switching judgement information (hereinafter referred to as "frequency information") to the frequency control unit 427.

The frequency control unit 427 generates the frequency signal on the basis of at least one of the analysis result of the switching judgement information, the load information of the information analysis unit 423, and the frequency information of the switching judgement information. The frequency control unit 427 generates the frequency signal representing a frequency lower than the frequency of occurrence of the switching judgement information.

For example, when the frequency of occurrence of the switching judgement information in a fixed time period (a fixed unit cycle) is equal to or larger than a first threshold value, the frequency control unit 427 generates the frequency signal so as to increase the frequency of notification of the switching judgement information with a frequency lower than the frequency of occurrence of the switching judgement information as an upper limit. The first threshold value is determined in advance. The frequency of occurrence of the switching judgement information may be the number of occurrences of the switching judgement information per unit time period in the fixed time period or the average value of the number of occurrences of the switching judgement information per unit time period in the fixed time period.

The frequency control unit 427 outputs the frequency signal to the frequency signal transmission unit 44. The frequency signal transmission unit 44 transmits the frequency signal to the notification processing unit 61. Thus, the notification frequency of the switching judgement information is controlled.

The frequency control unit 427 may generate a discard instruction signal when the frequency of occurrence of the switching judgement information in the fixed time period is less than the first threshold value. Thus, the past switching judgement information is discarded from the storage unit 422. Since the past switching judgement information is discarded from the storage unit 422, the switching judgement information of the analysis object by the information analysis unit 423 is reduced. Therefore, it is possible to suppress an increase in the load of processing for allocating the wavelength to the optical path.

The frequency control unit 427 may generate the allocation request signal when the frequency of occurrence of the switching judgement information in the fixed time period is equal to or larger than a second threshold value. The second threshold value is determined in advance. The absolute value of the second threshold value is larger than the absolute value of the first threshold value, for example. The frequency control unit 427 outputs the allocation request signal to the wavelength switching judgement unit 424. The frequency control unit 427 may generate the allocation request signal when the change amount of the frequency of occurrence of the switching judgement information in the fixed time period is equal to or larger than a predetermined threshold value.

The wavelength allocation unit 431 acquires the allocation instruction signal from the wavelength switching judgement unit 424. When acquiring the allocation instruction signal from the wavelength switching judgement unit 424, the wavelength allocation unit 431 generates the allocation signal on the basis of the network topology of a plurality of wavelength switching devices 5 and the allocation instruction signal. The allocation instruction signal includes, for example, the analysis result by the wavelength switching judgement unit 424. The wavelength allocation unit 431 performs wavelength allocation to the optical path by using the allocation signal. That is, the wavelength allocation unit 431 switches the wavelength with respect to the optical path. The wavelength allocation unit 431 may add and discard wavelengths to and from the optical path.

The allocation signal transmission unit 432 transmits the allocation signal to each wavelength switching device 5. By switching the wavelength of the optical signal, the route (optical path) of the optical signal between the aggregation station 3 and the distributed station 6 can be controlled.

Next, an operation example of the communication system 1*a* will be described.

Figure 3:
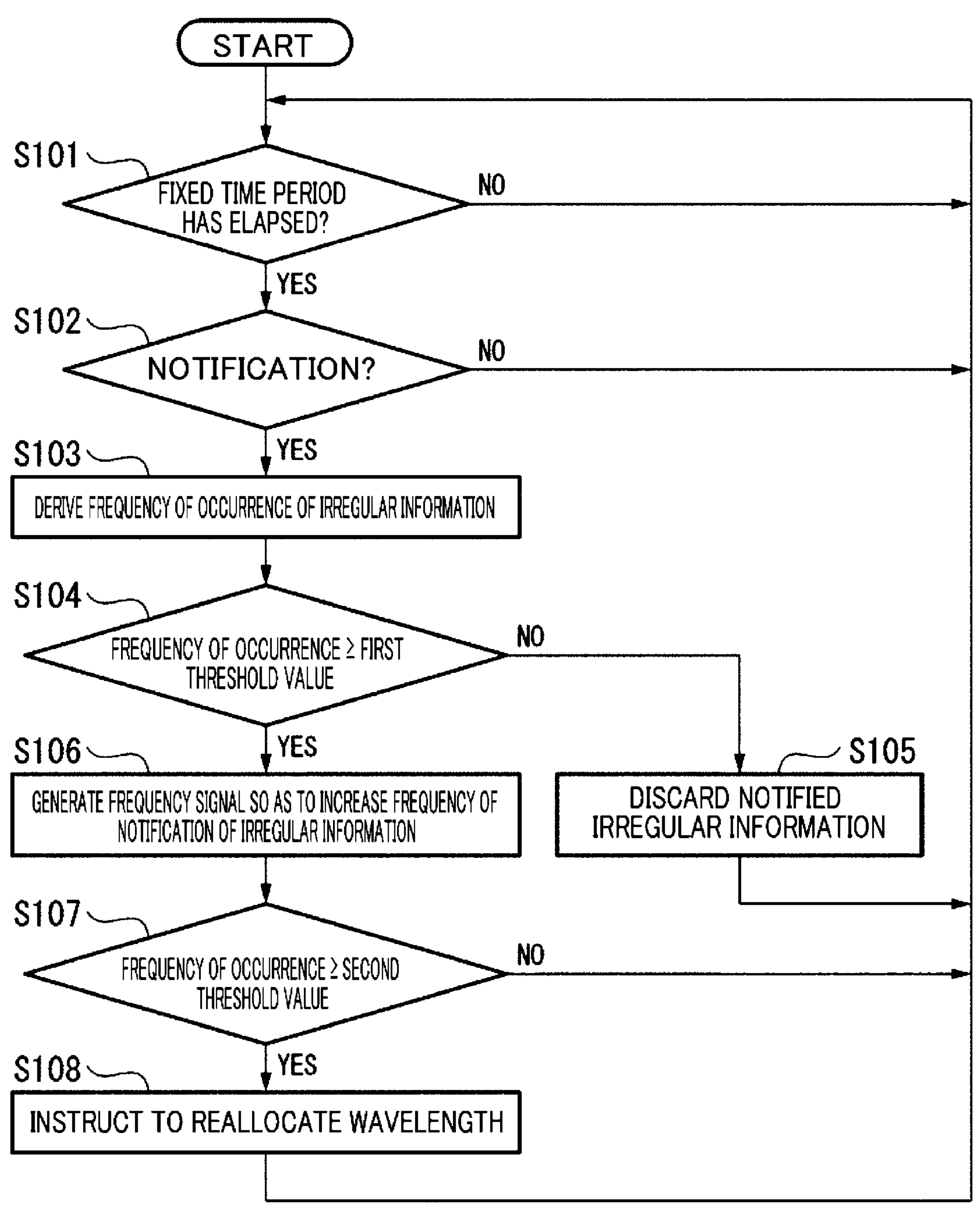
FIG. 3 is a flowchart showing an example of an operation of the wavelength allocation control device for irregular information according to the first embodiment.

FIG. 3 is a flowchart showing an example of the operation of the wavelength allocation control device 4 for the irregular information according to the first embodiment. The frequency derivation unit 426 judges whether or not a fixed time period (a fixed unit cycle) has elapsed (step S101). This fixed time period is not limited to a particular time period length, but is, for example, 125 μs. When it is judged that the fixed time period has not elapsed (step S101: NO), the frequency control unit 427 returns the processing to the step S101.

When it is judged that the fixed time period has elapsed (step S101: YES), the frequency derivation unit 426 judges whether or not notification of irregular information such as information (Registration information) related to the number of connections of the wireless terminal 8 is present within the fixed time period (step S102). When it is judged that the notification of irregular information is not present within the fixed time period (step S102: NO), the frequency control unit 427 returns the processing to the step S101.

When it is determined that the notification of the irregular information is present within the fixed time period (step S102: YES), the frequency derivation unit 426 derives the frequency of occurrence of the irregular information (step S103). The frequency control unit 427 judges whether or not the frequency of occurrence of the irregular information is equal to or larger than the first threshold value (step S104). When it is judged that the frequency of occurrence of the irregular information is less than the first threshold value (step S104: NO), the storage processing unit 421 (storage processor) does not record the irregular information notified within the fixed time period in the storage unit 422 (storage), and discards the irregular information notified within the fixed time period on the basis of the discard instruction signal (step S105). Note that the frequency control unit 427 may generate the frequency signal so as to reduce the frequency of notification of the irregular information. For example, the notification frequency after the low change is half of the notification frequency before the low change. For example, the notification frequency after the low change may be one fourth of the notification frequency before the low change.

When it is judged that the frequency of occurrence of the irregular information is equal to or larger than the first threshold value (step S104: NO), the frequency control unit 427 generates the frequency signal so as to increase the frequency of notification of the irregular information with a frequency lower than the frequency of occurrence of the irregular information as an upper limit. For example, the notification frequency after the high change is twice the notification frequency before the high change (step S106).

Note that the frequency control unit 427 may judge whether or not the load amount of the processing in the information analysis unit 423 is equal to or larger than a predetermined threshold value on the basis of the load information. The frequency control unit 427 may generate the frequency signal so as to reduce the frequency of notification of the irregular information, when it is judged that the load amount is equal to or larger than the predetermined threshold value.

The frequency control unit 427 judges whether or not the frequency of occurrence of the irregular information is equal to or larger than the second threshold value (step S107). When it is judged that the frequency of occurrence of the irregular information is less than the second threshold value (step S107: NO), the frequency control unit 427 returns the processing to the step S101.

When it is judged that the frequency of occurrence of the irregular information is equal to or larger than the second threshold value (step S107: YES), the frequency control unit 427 outputs the allocation request signal to the wavelength switching judgement unit 424 in order to instruct the wavelength switching judgement unit 424 to reallocate the wavelength (step S108). The frequency control unit 427 returns the processing to the step S101.

Figure 4:
FIG. 4 is a timechart showing an example of the operation of the wavelength allocation control device for the irregular information according to the first embodiment.

FIG. 4 is a flowchart showing an example of the operation of the wavelength allocation control device 4 for the irregular information according to the first embodiment. The irregular information is, for example, information "Registration information" related to the number of connections (the number of sessions) of the wireless terminal 8. The information to be grasped by the information analysis unit 423 is information related to increase and deletion of the band until the time point of switching the wavelength of the optical path. Therefore, it is not necessary to notify the irregular information every time the irregular information occurs. Further, it is not necessary to control the wavelength of the optical path every time the irregular information occurs.

The notification processing unit 61 notifies the acquisition unit 41 of each piece of irregular information occurred in a fixed time period (a fixed unit cycle) from the time point t1 to the time point t2 by collecting them up to the time point t2 based on the frequency signal. When the frequency of occurrence of the irregular information in the fixed time period from the time point t1 to the time point t2 is less than the first threshold value, the storage processing unit 421 discards the irregular information occurred by the time point t2 from the storage unit 422.

In a fixed time period from the time point t2 to the time point t3, no irregular information occurs. Therefore, the notification processing unit 61 does not notify the acquisition unit 41 of the irregular information in the fixed time period from the time point t2 to the time point t3.

The notification processing unit 61 notifies the acquisition unit 41 of each piece of irregular information occurred in a fixed time period from the time point t3 to the time point t4 by collecting them up to the time point t4 based on the frequency signal. When the frequency of occurrence of the irregular information in the fixed time period from the time point t3 to the time point t4 is equal to or larger than the first threshold value, the storage processing unit 421 records the irregular information (irregular information of the latest period) occurred from the time point t3 to the time point t4 in the storage unit 422. The notification processing unit 61 may generate the frequency signal so as to increase the frequency of notification of the irregular information with a frequency lower than the frequency of occurrence of the irregular information as an upper limit. In addition, when the frequency of occurrence of the irregular information is equal to or larger than the second threshold value, the frequency control unit 427 may output the allocation request signal to the wavelength switching judgement unit 424 in order to instruct the wavelength switching judgement unit 424 to reallocate the wavelength. The frequency control unit 427 may generate the allocation request signal when the change amount of the frequency of occurrence of the irregular information in the fixed time period is equal to or larger than the predetermined threshold value.

The notification processing unit 61 notifies the acquisition unit 41 of each piece of irregular information occurred in a fixed time period from the time point t4 to the time point t5 by collecting them up to the time point t5 based on the frequency signal. When the frequency of occurrence of the irregular information in the fixed time period from the time point t4 to the time point t5 is equal to or larger than the first threshold value, the storage processing unit 421 records the irregular information (irregular information of the latest period) occurred from the time point t4 to the time point t5 in the storage unit 422. The notification processing unit 61 may generate the frequency signal so as to increase the frequency of notification of the irregular information with a frequency lower than the frequency of occurrence of the irregular information as an upper limit. In addition, when the frequency of occurrence of the irregular information is equal to or larger than the second threshold value, the frequency control unit 427 may output the allocation request signal to the wavelength switching judgement unit 424 in order to instruct the wavelength switching judgement unit 424 to reallocate the wavelength.

The notification processing unit 61 notifies the acquisition unit 41 of each piece of irregular information occurred in a fixed time period from the time point t5 to the time point t6 by collecting them up to the time point t6 based on the frequency signal. When the frequency of occurrence of the irregular information in the fixed time period from the time point t5 to the time point t6 is less than the first threshold value, the storage processing unit 421 discards the irregular information occurred by the time point t6 from the storage unit 422.

Figure 5:
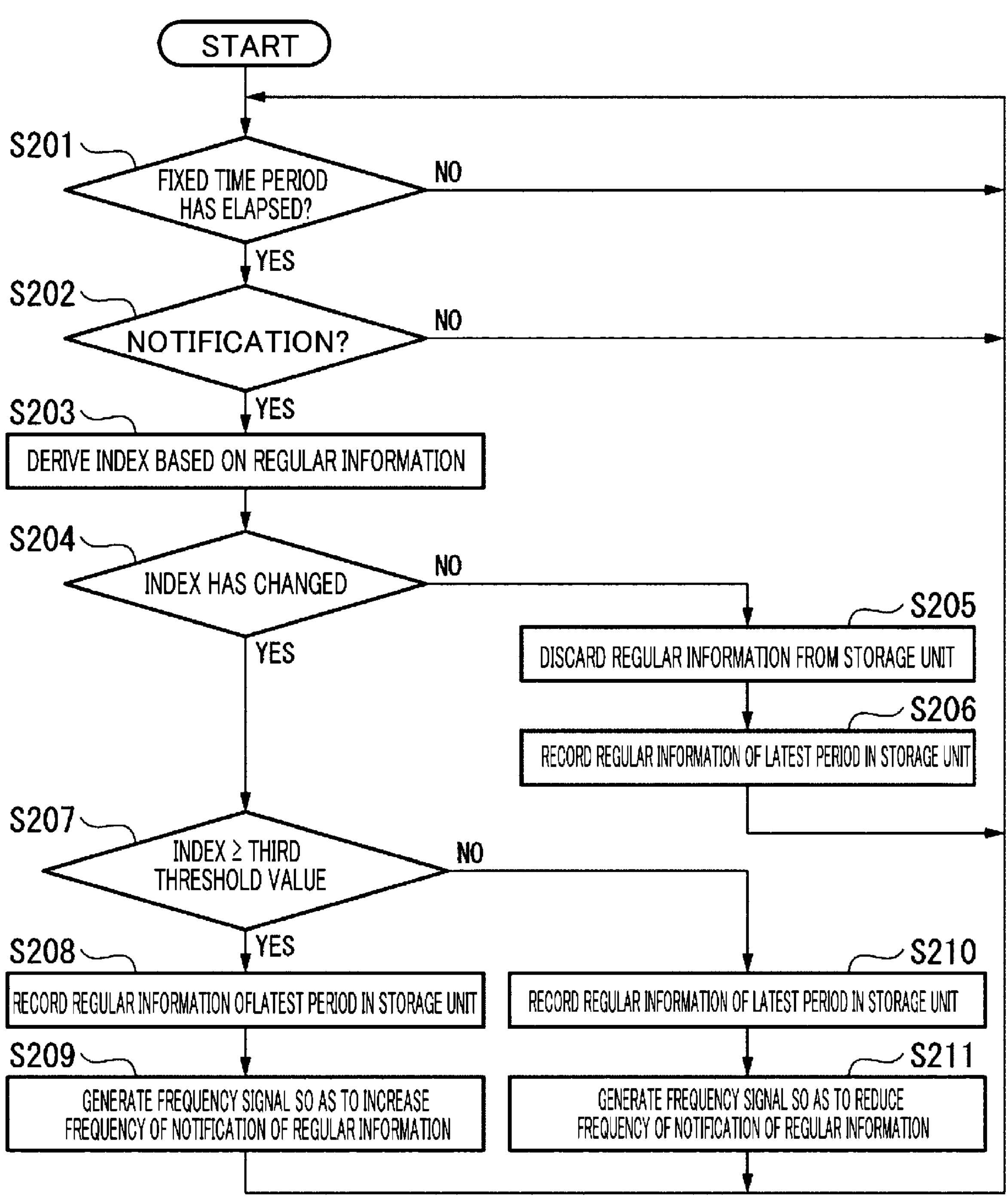
FIG. 5 is a flowchart showing an example of the operation of the wavelength allocation control device for regular information according to the first embodiment.

FIG. 5 is a flowchart showing an example of the operation of the wavelength allocation control device 4 for the regular information according to the first embodiment. The operation of step S201 is similar to the step S101 shown in FIG. 3.

When it is judged that the fixed time period has elapsed (step S201: YES), the frequency derivation unit 426 judges whether or not notification of regular information such as scheduling information is present within the fixed time period (step S202). When it is judged that the notification of regular information is not present within the fixed time period (step S202: NO), the frequency control unit 427 returns the processing to the step S201.

When it is judged that the notification of the regular information is present within the fixed time period (step S202: YES), the frequency control unit 427 derives an index on the basis of the regular information notified within the fixed time period. For example, the frequency control unit 427 derives the index on the basis of the analysis result of the regular information (scheduling information) (step S203).

This index is not limited to a specific index, but is, for example, an average value or a total value of the data amount "$D_n$" (subscript "n" is an integer of 1 or more) described in each piece of scheduling information notified within the fixed time period. The data amount "$D_n$" is, for example, the amount of upstream data scheduled for transmission.

Note that the index may be a representative value "$D_a$" of the data amount "$D_n$" described in each piece of scheduling information notified within the fixed time period.

The frequency control unit 427 judges whether or not the index has changed more than the predetermined threshold value (step S204). When it is judged that the change amount of the index is less than the predetermined threshold value (step S204: NO), the frequency control unit 427 outputs the discard instruction signal to the storage processing unit 421 to discard the regular information within the fixed time period until the last time from the storage unit 422. That is, the frequency control unit 427 discards the regular information which is already stored from the storage unit 422 by using the discard instruction signal (step S205). The storage processing unit 421 records the latest regular information within the fixed time period (latest period) in the storage unit 422. That is, the storage processing unit 421 records the regular information within the current fixed time period in the storage unit 422 (step S206).

The frequency control unit 427 judges whether or not the index is equal to or larger than the third threshold value (step S207). When it is judged that the index is equal to or larger than the third threshold value (step S207: YES), the storage processing unit 421 records the regular information within the latest fixed time period (latest period) in the storage unit 422 (step S208). The frequency control unit 427 generates the frequency signal so as to increase the frequency of notification of the regular information with a frequency lower than the frequency of occurrence of the regular information as an upper limit (step S209). The frequency control unit 427 returns the processing to the step S201.

When it is judged that the index is less than the third threshold value (step S207: NO), the storage processing unit 421 records the regular information within the latest fixed time period (latest period) in the storage unit 422 (step S210). The frequency control unit 427 generates the frequency signal so as to reduce the frequency of notification of the regular information (step S211). The frequency control unit 427 returns the processing to the step S201.

Figure 6:
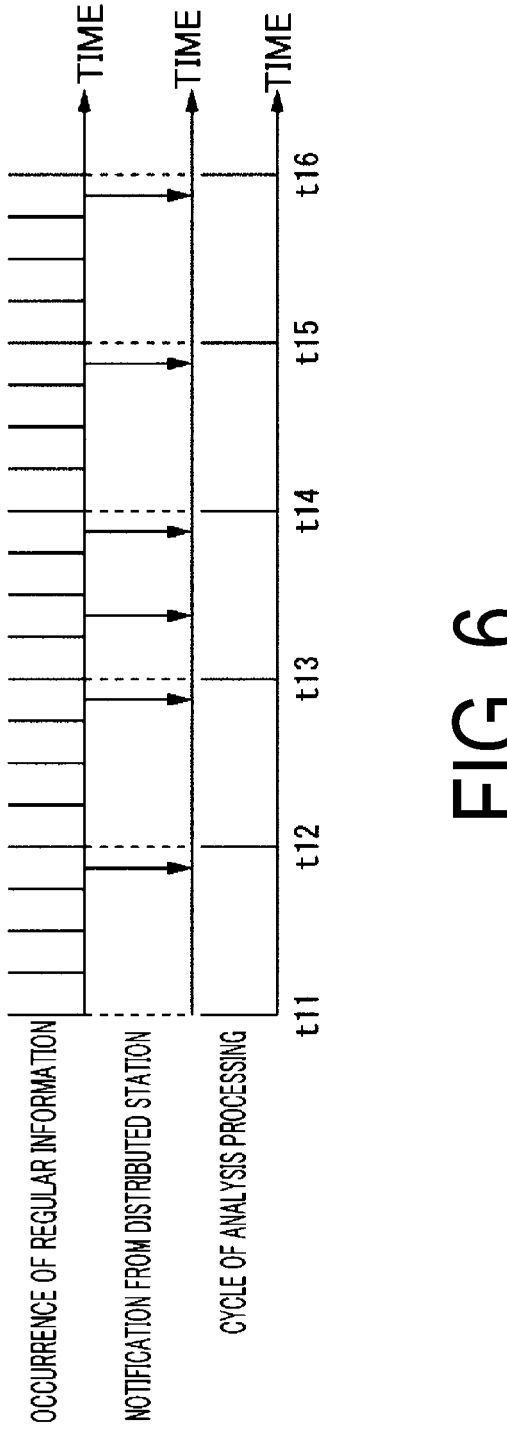
FIG. 6 is a timechart showing an example of the operation of the wavelength allocation control device for the regular information according to the first embodiment.

FIG. 6 is a timechart showing an example of the operation of the wavelength allocation control device 4 for the regular information according to the first embodiment. The regular information is, for example, scheduling information. The scheduling information is, for example, downlink control information. The information to be grasped by the information analysis unit 423 is information related to increase and deletion of a band until the time point of switching the wavelength of the optical path. Therefore, it is not necessary to notify the regular information every time the regular information occurs. Further, it is not necessary to control the wavelength of the optical path every time the regular information occurs.

The notification processing unit 61 notifies the acquisition unit 41 of each piece of regular information occurred in a fixed time period (a fixed unit cycle) from the time point t11 to the time point t12 by collecting them up to the time point t12 based on the frequency signal. Each piece of occurred regular information (each piece of scheduling information)

is "(time point, upstream data amount)=(t11, D1)", for example. The frequency control unit 427 derives an index on the basis of the analysis result of the regular information (scheduling information). The index is, for example, an average value or a total value of the data amount "$D_n$" described in each piece of scheduling information notified within the fixed time period. The index may be a combination of a representative value "$D_a$" of the upstream data amount "$D_n$" described in each piece of scheduling information notified within the fixed time period and the time point. The storage processing unit 421 records the regular information occurred from the time point t11 to the time point t12 in the storage unit 422.

The notification processing unit 61 notifies the acquisition unit 41 of each piece of regular information occurred in a fixed time period from the time point t12 to the time point t13 by collecting them up to the time point t13 based on the frequency signal. Each piece of occurred regular information (each piece of scheduling information) is "(time point, upstream data amount)=(t12, D2)", for example. The frequency control unit 427 derives an index on the basis of the analysis result of the regular information (scheduling information). When the index from the time point t12 to the time point t13 is equal to or larger than the third threshold value, the storage processing unit 421 records the regular information within the fixed time period from the time point t12 to the time point t13 in the storage unit 422. The frequency control unit 427 generates the frequency signal so as to increase the frequency of notification of the regular information with a frequency lower than the frequency of occurrence of the regular information as an upper limit.

The notification processing unit 61 notifies the acquisition unit 41 of each piece of regular information occurred in a fixed time period from the time point t13 to the time point t14 at a frequency higher than the frequency of notification in the fixed time period from the time point t12 to the time point t13 and by the time point t14 based on the frequency signal. Each piece of occurred regular information (each scheduling information) is "(time point, upstream data amount)=(t13, D3)", for example. When the index from the time point t13 to the time point t14 is less than the third threshold value, the storage processing unit 421 records the regular information within the fixed time period from the time point t13 to the time point t14 in the storage unit 422. The frequency control unit 427 generates the frequency signal so as to reduce the frequency of notification of the regular information.

The notification processing unit 61 notifies the acquisition unit 41 of each piece of regular information occurred in a fixed time period from the time point t14 to the time point t15 by collecting them up to the time point t15 based on the frequency signal. Each piece of occurred regular information (each piece of scheduling information) is "(time point, upstream data amount)=(t14, D4)", for example. The frequency control unit 427 derives an index on the basis of the analysis result of the regular information (scheduling information). The storage processing unit 421 records the regular information occurred from the time point t14 to the time point t15 in the storage unit 422.

In a fixed time period from the time point t15 to the time point t16, each piece of regular information similar to each piece of regular information occurred in the fixed time period from the time point t14 to the time point t15 occurs. Therefore, the storage processing unit 421 discards the regular information occurred by the time point t15 from the storage unit 422. The storage processing unit 421 records the regular information (regular information of the latest period) occurred from the time point t15 to the time point t16 in the storage unit 422.

As described above, the distributed station 6 notifies the acquisition unit 41 (acquisitor) of the switching judgement information related to one or more events occurred within the fixed time period at the predetermined notification frequency. The acquisition unit 41 acquires the switching judgement information from the notification processing unit 61 (notification processor). The information analysis unit 423 (information analyser) executes analysis processing on the switching judgement information. The frequency derivation unit 426 (frequency derivator) derives the occurrence frequency of the switching judgement information. The load derivation unit 425 (load derivator) derives the load of analysis processing of the switching judgement information. The frequency control unit 427 (frequency controller) controls the predetermined notification frequency of the switching judgement information with a frequency lower than the occurrence frequency as an upper limit on the basis of at least one of the analysis result (index) of the switching judgement information, the occurrence frequency of the switching judgement information, and the load of analysis processing of the switching judgement information.

Thus, it is possible to suppress an increase in the load of processing for allocating the wavelength to the optical path.

The switching judgement information is notified at the notification frequency corresponding to the frequency signal representing a frequency lower than the occurrence frequency of the switching judgement information. Therefore, since notification is suppressed each time the switching judgement information occurs, increase in notification frequency is suppressed. It is not necessary to increase capacity of the storage unit 422 of the wavelength allocation control device 4. The notified switching judgement information may be discarded. Since the capacity of the switching judgement information stored in the storage unit 422 is suppressed, the wavelength allocation control device 4 does not need to analyze the band fluctuation on the basis of a large amount of switching judgement information. A processor of the wavelength allocation control device 4 does not have to be highly functional. Since it is not necessary to make the processor highly functional, the increase of the cost of the wavelength allocation control device 4 is suppressed.

Second Embodiment

In a second embodiment, the difference from the first embodiment is that the cycle length of the analysis processing is variable. In the second embodiment, differences from the first embodiment will be mainly described.

Figure 7:
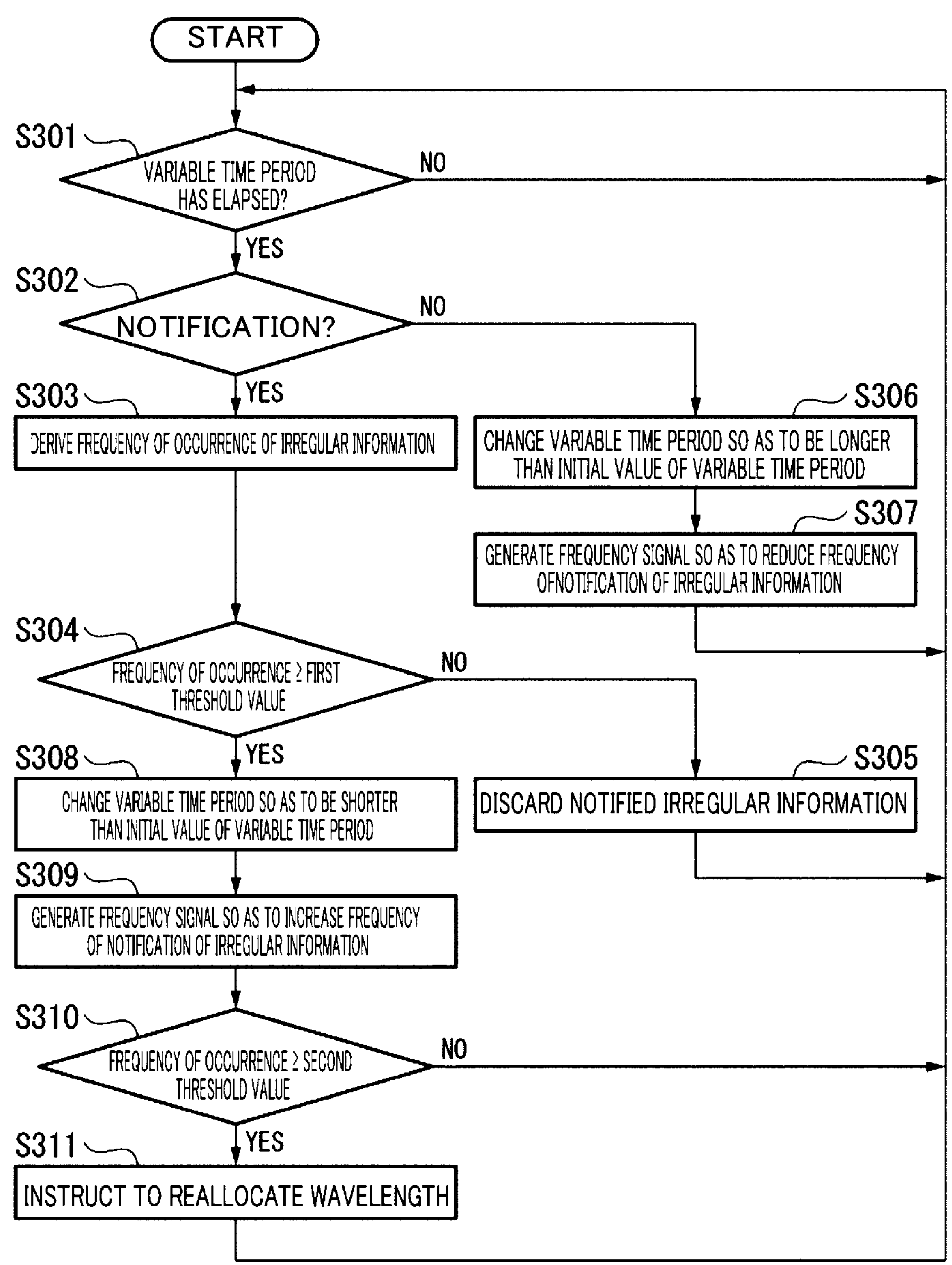
FIG. 7 is a flowchart showing an example of the operation of the wavelength allocation control device for the irregular information according to a second embodiment.

FIG. 7 is a flowchart showing an example of the operation of the wavelength allocation control device 4 for the irregular information according to the second embodiment. The frequency derivation unit 426 judges whether or not a variable time period (variable unit cycle) has elapsed (step S301). When it is judged that the variable time period has not elapsed (step S301: NO), the frequency control unit 427 returns the processing to the step S301.

When it is judged that the variable time period has elapsed (step S301: YES), the frequency derivation unit 426 judges whether or not notification of irregular information such as information (Registration information) related to the number of connections of the wireless terminal 8 is present within the variable time period (step S302).

When it is judged that the notification of the irregular information is present within the variable time period (step S302: YES), the frequency derivation unit 426 derives the frequency of occurrence of the irregular information (step S303). The frequency control unit 427 judges whether or not the frequency of occurrence of the irregular information is equal to or larger than the first threshold value (step S304). When it is judged that the frequency of occurrence of the irregular information is less than the first threshold value (step S304: NO), the storage processing unit 421 does not record the irregular information notified within the variable time period in the storage unit 422, and discards the notified irregular information on the basis of the discard instruction signal (step S305).

When it is judged that the notification of the irregular information is not present within the variable time period (step S302: NO), the frequency control unit 427 and the information analysis unit 423 change the variable time period in the step S301 so as to be longer than the initial value of the variable time period. That is, the information analysis unit 423 prolongs the cycle of the analysis processing. For example, the information analysis unit 423 doubles the cycle of analysis processing (step S306). The frequency control unit 427 generates the frequency signal so as to reduce the frequency of notification of the irregular information. For example, the notification frequency after the low change is half of the notification frequency before the low change (step S307). The frequency control unit 427 returns the processing to the step S301.

When it is judged that the frequency of occurrence of the irregular information is equal to or larger than the first threshold value (step S304: NO), the frequency control unit 427 and the information analysis unit 423 change the variable time period in the step S301 so as to be shorter than the initial value of the variable time period. That is, the information analysis unit 423 shortens the cycle of the analysis processing. For example, the information analysis unit 423 halves the cycle of analysis processing (step S308). The frequency control unit 427 generates the frequency signal so as to increase the frequency of notification of the irregular information with a frequency lower than the frequency of occurrence of the irregular information as an upper limit. For example, the notification frequency after the high change is twice the notification frequency before the high change (step S309).

The frequency control unit 427 judges whether or not the frequency of occurrence of the irregular information is equal to or larger than the second threshold value (step S310). When it is judged that the frequency of occurrence of the irregular information is less than the second threshold value (step S310: NO), the frequency control unit 427 returns to the processing to the step S301.

When it is judged that the frequency of occurrence of the irregular information is equal to or larger than the second threshold value (step S310: YES), the frequency control unit 427 outputs the allocation request signal to the wavelength switching judgement unit 424 in order to instruct the wavelength switching judgement unit 424 to reallocate the wavelength (step S311). The frequency control unit 427 returns the processing to the step S301.

Figure 8:
FIG. 8 is a timechart showing an example of the operation of the wavelength allocation control device for the irregular information according to the second embodiment.

FIG. 8 is a timechart showing an example of the operation of the wavelength allocation control device 4 for the irregular information according to the second embodiment. The notification processing unit 61 notifies the acquisition unit 41 of each piece of irregular information occurred in a variable time period from the time point t21 to the time point t22 by collecting them up to the time point t22 based on the frequency signal. When the frequency of occurrence of the irregular information in the variable time period from the time point t21 to the time point t22 is less than the first threshold value, the storage processing unit 421 discards the irregular information occurred by the time point t22 from the storage unit 422.

No irregular information occurs in a variable time period from the time point t22 to the time point t23. Therefore, the notification processing unit 61 does not notify the acquisition unit 41 of the irregular information in the variable time period from the time point t22 to the time point t23. Since the irregular information does not occur, the information analysis unit 423 prolongs the cycle of analysis processing (the cycle of observation). The frequency control unit 427 generates the frequency signal so as to reduce the frequency of notification of the irregular information.

The notification processing unit 61 notifies the acquisition unit 41 of each piece of irregular information occurred in a variable time period from the time point t23 to the time point t25 by collecting them up to the time point t25 based on the frequency signal. When the frequency of occurrence of the irregular information in the variable time period (variable unit cycle) from the time point t23 to the time point t25 is equal to or larger than the first threshold value, the storage processing unit 421 records the irregular information (irregular information of the latest period) occurred from the time point t23 to the time point t25 in the storage unit 422. The frequency control unit 427 generates the frequency signal so as to increase the frequency of notification of the irregular information with a frequency lower than the frequency of occurrence of the irregular information as an upper limit. In addition, the information analysis unit 423 shortens the cycle of analysis processing (the cycle of observation).

The notification processing unit 61 notifies the acquisition unit 41 of each piece of irregular information occurred in a variable time period from the time point t25 to the time point t26 by collecting them up to the time point t26 based on the frequency signal. When the frequency of occurrence of the irregular information in the variable time period from the time point t25 to the time point t26 is equal to or larger than the first threshold value, the storage processing unit 421 records the irregular information (irregular information of the latest period) occurred from the time point t23 to the time point t25 in the storage unit 422. In addition, when the frequency of occurrence of the irregular information is equal to or larger than the second threshold value, the frequency control unit 427 outputs the allocation request signal to the wavelength switching judgement unit 424 in order to instruct the wavelength switching judgement unit 424 to reallocate the wavelength.

The notification processing unit 61 notifies the acquisition unit 41 of each piece of irregular information occurred in a variable time period from the time point t26 to the time point t27 by collecting them up to the time point t27 based on the frequency signal. When the frequency of occurrence of the irregular information in the variable time period from the time point t26 to the time point t27 is less than the first threshold value, the storage processing unit 421 discards the irregular information occurred by the time point t27 from the storage unit 422.

As described above, the information analysis unit 423 may prolong the cycle of the analysis processing. The information analysis unit 423 may shorten the cycle of analysis processing. The distributed station 6 notifies the acquisition unit 41 of the switching judgement information related to one or more events occurred within the variable time period at the predetermined notification frequency. The acquisition unit 41 acquires the switching judgement information from the notification processing unit 61. The information analysis unit 423 executes analysis processing on the switching judgement information. The frequency derivation unit 426 derives the occurrence frequency of the switching judgement information. The load derivation unit 425 derives the load of analysis processing of the switching judgement information. The frequency control unit 427 controls the predetermined notification frequency of the switching judgement information with a frequency lower than the occurrence frequency as an upper limit on the basis of at least one of the analysis result (index) of the switching judgement information, the occurrence frequency of the switching judgement information, and the load of analysis processing of the switching judgement information.

Thus, it is possible to suppress an increase in the load of processing for allocating the wavelength to the optical path.

Third Embodiment

In the third embodiment, the difference from the first embodiment and the second embodiment is that the distributed station control device for controlling the distributed station 6 transmits the switching judgement information to the wavelength allocation control device 4. In the third embodiment the differences from the first embodiment and the second embodiment will be described mainly.

Figure 9:
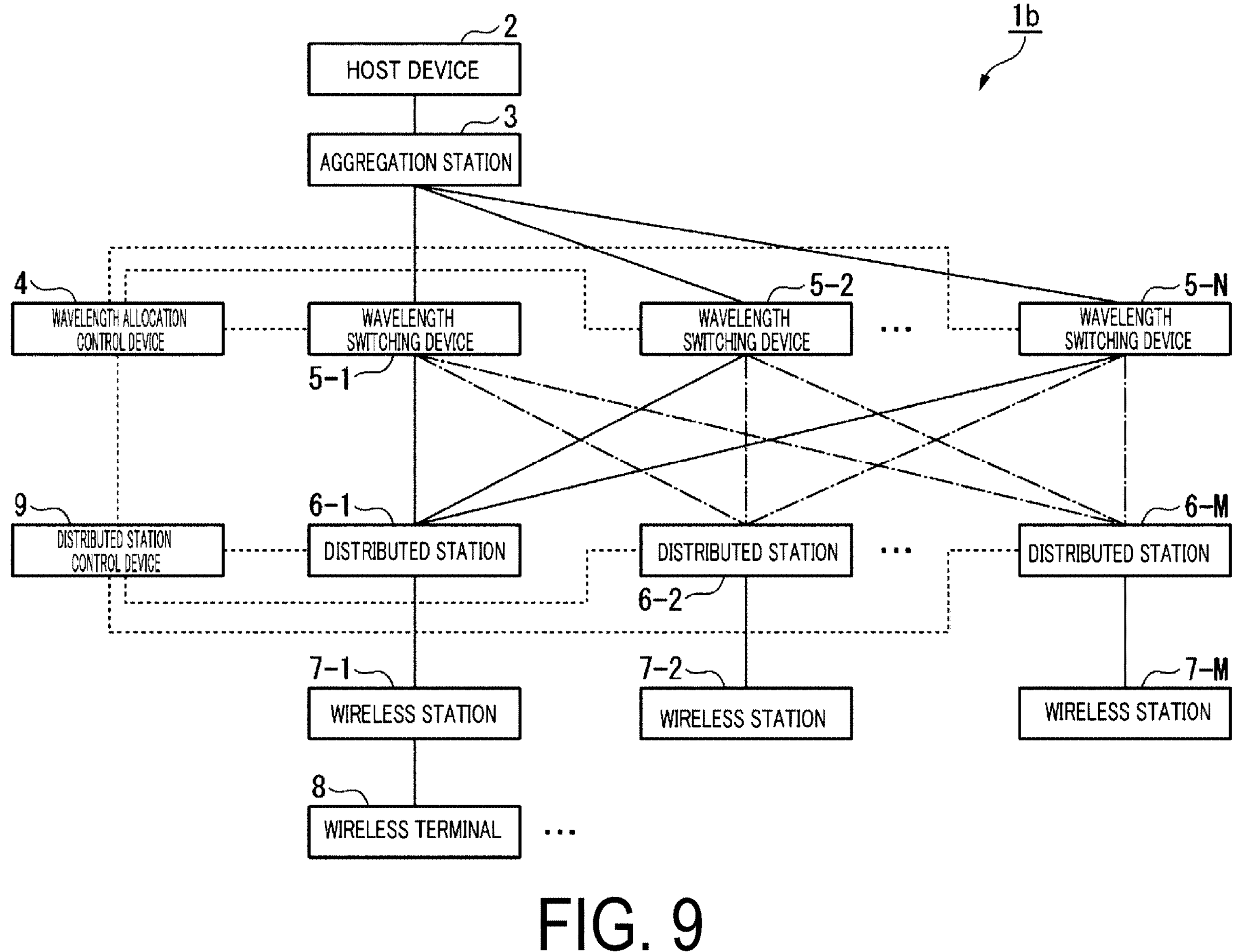
FIG. 9 is a diagram showing a configuration example of a communication system according to a third embodiment.

FIG. 9 is a diagram showing a configuration example of a communication system **1*b* according to the third embodiment. The communication system 1*b* includes a host device 2, an aggregation station 3, a wavelength allocation control device 4, N wavelength switching devices 5, M distributed stations 6, M wireless stations 7, and a distributed station control device 9. One or more wireless terminals 8 may be communicatively connected to the distributed station 6 via the wireless station 7. The distributed station control device 9 controls the operation of each distributed station 6. For example, the distributed station control device 9 controls the frequency of notification of the switching judgement information transmitted from the distributed station 6**.

Figure 10:
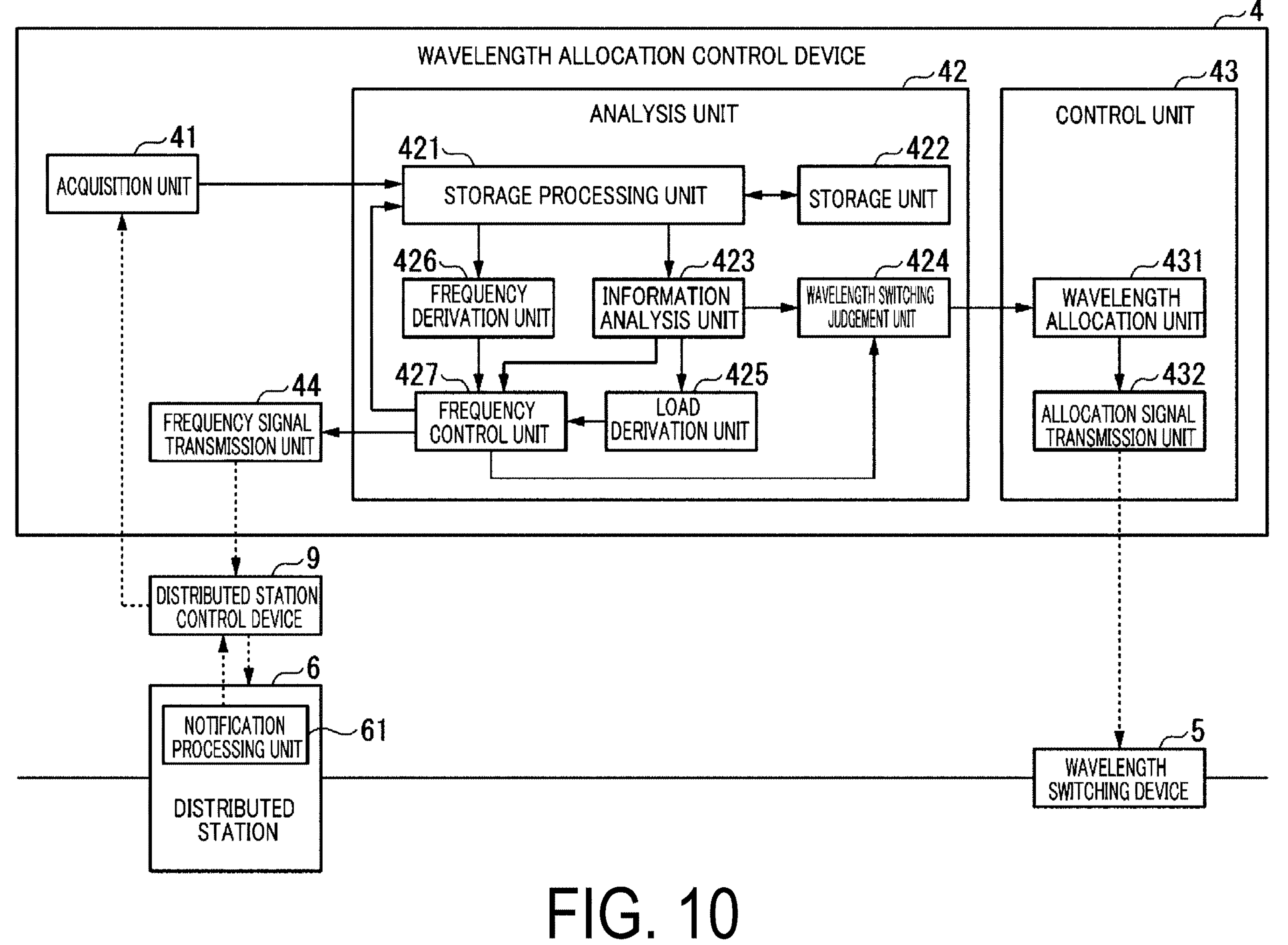
FIG. 10 is a diagram showing a configuration example of a wavelength allocation control device according to the third embodiment.

FIG. 10 is a diagram showing a configuration example of the wavelength allocation control device 4 according to the third embodiment. The frequency signal transmission unit 44 transmits the frequency signal to the distributed station control device 9. The distributed station control device 9 transmits the frequency signal to the notification processing unit 61. The notification processing unit 61 transmits the switching judgement information to the acquisition unit 41 at the notification frequency corresponding to the frequency signal acquired from the distributed station control device 9. The acquisition unit 41 acquires the notified switching judgement information from the notification processing unit 61. The acquisition unit 41 outputs the switching judgement information to the storage processing unit 421 each time the switching judgement information is acquired.

As described above, the distributed station control device 9 controls the operation of each distributed station 6. The distributed station control device 9 controls the frequency of notification of the switching judgement information transmitted from the distributed station 6 on the basis of the frequency signal.

Thus, even if the frequency signal is not transmitted to each distributed station 6, an increase in the load of processing for allocating the wavelength to the optical path can be suppressed.

Hardware Configuration Example

Figure 11:
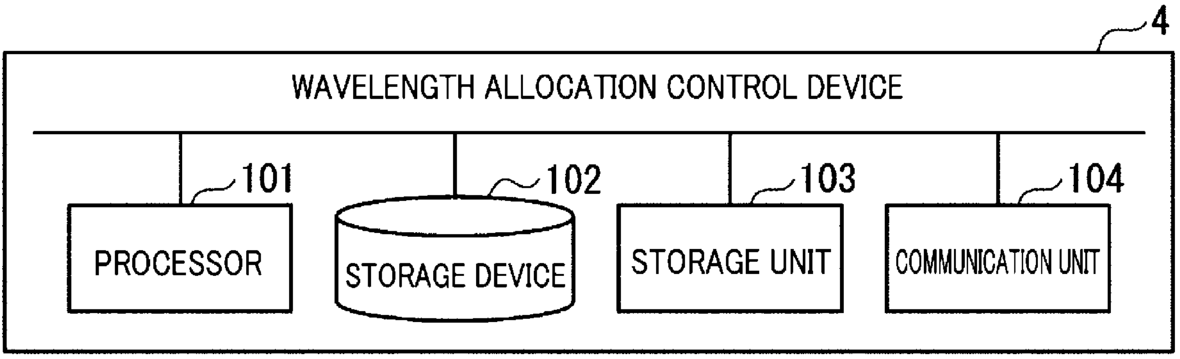
FIG. 11 is a diagram showing a hardware configuration example of the wavelength allocation control device according to each embodiment.

FIG. 11 is a diagram showing a hardware configuration example of the wavelength allocation control device 4 according to each embodiment. A part or all of functional units of the wavelength allocation control device 4 are realized as software by causing a processor 101 such as a CPU (Central Processing Unit) to execute a program stored in a storage device 102 and a storage unit 103 (memory) including a non-volatile recording medium (non-transitory recording medium). The program may be recorded in the non-transitory recording medium which is computer-readable. Examples of the non-transitory recording medium which is computer-readable include a portable medium such as a flexible disc, a magneto-optical disc, a ROM (Read Only Memory), or a CD-ROM (Compact Disc Read Only Memory), and a non-transitory recording medium such as a storage device such as a hard disk incorporated in a computer system. A communication unit 104 executes the predetermined communication processing. The communication unit 104 may acquire data and the program.

A part or all of the functional units of the wavelength allocation control device 4 may be realized using hardware including an electronic circuit or circuitry in which an LSI (Large Scale Integrated circuit), an ASIC (Application Specific Integrated Circuit), a PLD (Programmable Logic Device), an FPGA (Field Programmable Gate Array), or the like is used.

Each embodiment may be combined.

Although the above embodiment of the present invention has been described in detail with reference to the drawings, a specific configuration is not limited to this embodiment, and design within the scope of the gist of the present invention, and the like are included.

INDUSTRIAL APPLICABILITY

The present invention is applicable to the optical communication system such as an optical access system.

REFERENCE SIGNS LIST

**1*a*, 1*b*** Communication system
2 Host device
3 Aggregation station
4 Wavelength allocation control device
5 Wavelength switching device
6 Distributed station
7 Wireless station
8 Wireless terminal
9 Distributed station control device
41 Acquisition unit
42 Analysis unit
43 Control unit
44 Frequency signal transmission unit
61 Notification processing unit
101 Processor
102 Storage device
103 Storage unit
104 Communication unit
421 Storage processing unit
422 Storage unit
423 Information analysis unit
424 Wavelength switching judgement unit
425 Load derivation unit
426 Frequency derivation unit
427 Frequency control unit
431 Wavelength allocation unit
432 Allocation signal transmission unit

The invention claimed is:

1. A control device comprising:

an acquisitor configured to acquire information used for judging a wavelength switching to an optical path, from a distributed station that notifies the information related to one or more events occurred within a predetermined time period at a predetermined notification frequency;

an information analyser configured to execute analysis processing on the information;

a frequency derivator configured to derive an occurrence frequency of the information;

a load derivator configured to derive a load of analysis processing of the information;

a frequency controller configured to control the predetermined notification frequency with a frequency lower than the occurrence frequency as an upper limit on the basis of an occurrence frequency of the information;

a storage processor configured to record the information notified from the distributed station in a storage in association with the notification time, and discard the information from the storage when it is judged that the occurrence frequency of the information is less than a predetermined threshold value.

2. A communication system comprising a distributed station and a control device, wherein the distributed station comprises a notification processor that notifies information related to one or more events occurred within a predetermined time period at a predetermined notification frequency, and the control device comprises an acquisitor that acquires the information used for judging a wavelength switching to an optical path, an information analyser that executes analysis processing on the information, a frequency derivator that derives an occurrence frequency of the information, a load derivator that derives a load of analysis processing of the information, and a frequency controller that controls the predetermined notification frequency with a frequency lower than the occurrence frequency as an upper limit on the basis of an occurrence frequency of the information, and a storage processor that records the information notified from the distributed station in a storage in association with the notification time, and discards the information from the storage when it is judged that the occurrence frequency of the information is less than a predetermined threshold value.

3. A control method executed by a control device, the control method comprising:

acquiring information used for judging a wavelength switching to an optical path, from a distributed station that notifies the information related to one or more events occurred within a predetermined time period at a predetermined notification frequency;

executing analysis processing on the information;

deriving an occurrence frequency of the information;

deriving a load of analysis processing of the information;

controlling the predetermined notification frequency with a frequency lower than the occurrence frequency as an upper limit on the basis of an occurrence frequency of the information; and recording the information notified from the distributed station in a storage in association with the notification time, and discarding the information from the storage when it is judged that the occurrence frequency of the information is less than a predetermined threshold value.

4. A non-transitory computer readable medium which stores a program for causing a computer to function as the control device according to claim 1.

* * * * *